United States Patent
Tsai

(10) Patent No.: US 9,435,265 B2
(45) Date of Patent: Sep. 6, 2016

(54) GAS COMBUSTOR INSTALLED AND DETACHABLE IGNITION MODULE THEREOF

(71) Applicant: Chin-Lin Tsai, New Taipei (TW)

(72) Inventor: Chin-Lin Tsai, New Taipei (TW)

(*) Notice: Subject to any disclaimer, the term of this patent is extended or adjusted under 35 U.S.C. 154(b) by 798 days.

(21) Appl. No.: 13/845,263

(22) Filed: Mar. 18, 2013

(65) Prior Publication Data

US 2013/0255222 A1 Oct. 3, 2013

(30) Foreign Application Priority Data

Mar. 27, 2012 (TW) .............................. 101110551 A

(51) Int. Cl.
*F02C 7/264* (2006.01)
*F23Q 3/00* (2006.01)
*F23D 14/38* (2006.01)
*F23D 14/36* (2006.01)

(52) U.S. Cl.
CPC .............. *F02C 7/264* (2013.01); *F23D 14/36* (2013.01); *F23D 14/38* (2013.01); *F23Q 3/008* (2013.01); *F23D 2207/00* (2013.01)

(58) Field of Classification Search
CPC ........ H04B 7/024; F02C 7/264; F02C 7/266; F23Q 3/008; F23D 14/38
USPC ......... 431/42, 255, 259, 263, 264, 127, 132, 431/131, 142, 143
See application file for complete search history.

(56) References Cited

U.S. PATENT DOCUMENTS

| | | | | |
|---|---|---|---|---|
| 3,509,388 A | * | 4/1970 | Takeuchi | F21K 5/023 310/339 |
| 5,505,614 A | * | 4/1996 | Lin | F23D 14/28 431/143 |
| 5,997,282 A | * | 12/1999 | Man | F23Q 2/164 431/153 |
| 6,666,421 B2 | * | 12/2003 | Hueser | F24C 3/103 248/229.26 |
| 2004/0029060 A1 | * | 2/2004 | Oglesby | F23D 14/18 431/255 |
| 2007/0287114 A1 | * | 12/2007 | Huang | F23Q 2/164 431/153 |
| 2008/0137293 A1 | * | 6/2008 | Yang | H05K 7/20172 361/695 |
| 2010/0297567 A1 | * | 11/2010 | Guillou | F23D 14/465 431/254 |

* cited by examiner

*Primary Examiner* — Rabeeul Zuberi
(74) *Attorney, Agent, or Firm* — Guice Patents PLLC

(57) ABSTRACT

The present invention relates to a gas combustor, which includes a casing unit of the gas combustor and a detachable ignition module, the detachable ignition module is to have an igniter being modularized as a single unit, thereby being enabled to be inserted in or removed from an insertion slot preformed on a surface of the casing unit of the gas combustor, and a cathode connecting joint and a anode connecting joint of the detachable ignition module are respectively in contact with or separated from an electric conductive wire installed in the insertion slot, thereby establishing or terminating an electric connection, so the inconvenience and possible danger of replacing the igniter by the user himself is avoided.

8 Claims, 4 Drawing Sheets

GAS COMBUSTOR INSTALLED AND DETACHABLE IGNITION MODULE THEREOF

BACKGROUND OF THE INVENTION

1. Field of the Invention:

The present invention relates to a gas combustor, especially to a gas combustor installed with a detachable ignition module.

2. Description of Related Art:

Fire is a must have element in our lives, with fire, we can cook food, can be provided with lighting, and the fire can also be used for combustion operations such as forging, soldering and welding. Take a gas combustor for example, e.g. a refillable lighter or a portable gas stove, liquid gas is provided therein for lighting objects or cooking food, so the gas combustor still plays an important role in our lives which cannot be easily replaced.

Take a gas combustor for instance, a fuel storing tank is often installed in a casing unit, the top of the fuel storing tank is installed with a gas discharge nozzle, the gas discharge nozzle is controlled by a control device for whether supplying fuel gas to a combustion device. When a push button of the control device is pushed, the gas discharge nozzle is stretched for guiding the fuel gas to a soft gas pipe provided between the gas discharge nozzle and the combustion device, thereby allowing the fuel gas to enter the combustion device, and the current generated through the fuel gas entering the combustion device would introduce the ambient air, the fuel gas is then mixed with the air in the combustion device thereby forming a mixed fuel gas which can be ejected from a flame nozzle.

For enhancing the convenience in use, the interior of the gas combustor is often installed with an igniter, and the igniter is disposed in the push button of the mentioned control device. As such, when the push button is pushed, the gas discharge nozzle is enabled to output fuel gas and the igniter is synchronously squeezed, high voltage electrostatic arc is generated between the flame nozzle and a distal end of an electric conductive wire disposed at one side of the flame nozzle and spaced with an interval so as to ignite the mixed fuel gas for processing the combustion operation.

In fact, a situation of the igniter being damaged after being repeatedly pushed and operated often occurs, such situation may cause the gas combustor not being able to be ignited and may be thrown away. The user can replace the igniter by himself for prolonging the service life of the gas combustor, but the igniter having the same specification is not easy to be found, and the replacement or maintenance carried out by the user himself may face the difficulty in assembly or cause the internal components to be missed or damaged due to the lack of knowledge about the internal structure of gas combustor, thereby the future operation may be loaded with unexpected danger.

SUMMARY OF THE INVENTION

One primary objective of the present invention is to provide a gas combustor, which includes a casing unit of the gas combustor and a detachable ignition module, the detachable ignition module is to have an igniter being modularized as a single unit, thereby being enabled to be inserted in or removed from an insertion slot preformed on a surface of the casing unit of the gas combustor, so the inconvenience and possible danger of replacing the igniter by the user himself is avoided.

For achieving aforesaid objective, one technical solution of the present invention is to provide a gas combustor, which includes:

a casing unit, a surface thereof is formed with an insertion slot, the interior of the insertion slot is installed with an electric conductive wire being in contact with a combustion device; and a detachable ignition module, having an enveloping member installed with an igniter therein, so a push rod, a cathode connecting joint and an anode connecting joint of the igniter are respectively protruded from a front, a rear and a lateral opening formed on the enveloping member, and a push button is connected to the push rod, thereby allowing the push button to push the push rod;

through the detachable ignition module being inserted in or removed from the insertion slot, the cathode connecting joint and the anode connecting joint of the detachable ignition module are respectively in contact with or separated from the electric conductive wire installed in the insertion slot, thereby establishing or terminating an electric connection.

Another objective of the present invention is to provide a detachable ignition module used in a gas combustor, wherein an igniter is modularized to a single unit, thereby being enabled to be inserted in or removed from an insertion slot preformed on a surface of a casing unit of the gas combustor, so the inconvenience and possible danger of replacing the igniter by the user himself is avoided.

For achieving aforesaid objective, one technical solution of the present invention is to provide a detachable ignition module used in a gas combustor, which includes:

an igniter, the front and the rear thereof are respectively installed with a push rod and a cathode connecting joint, a lateral side thereof is extended with an conductive wire, one free end of the conductive wire is connected to an anode connecting joint; and an enveloping member, used for enveloping the igniter, and the push rod, the cathode connecting joint and the anode connecting joint are respectively protruded from a front, a rear and a lateral opening formed on the enveloping member, and a push button is connected to the push rod, thereby allowing the push button to push the push rod.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
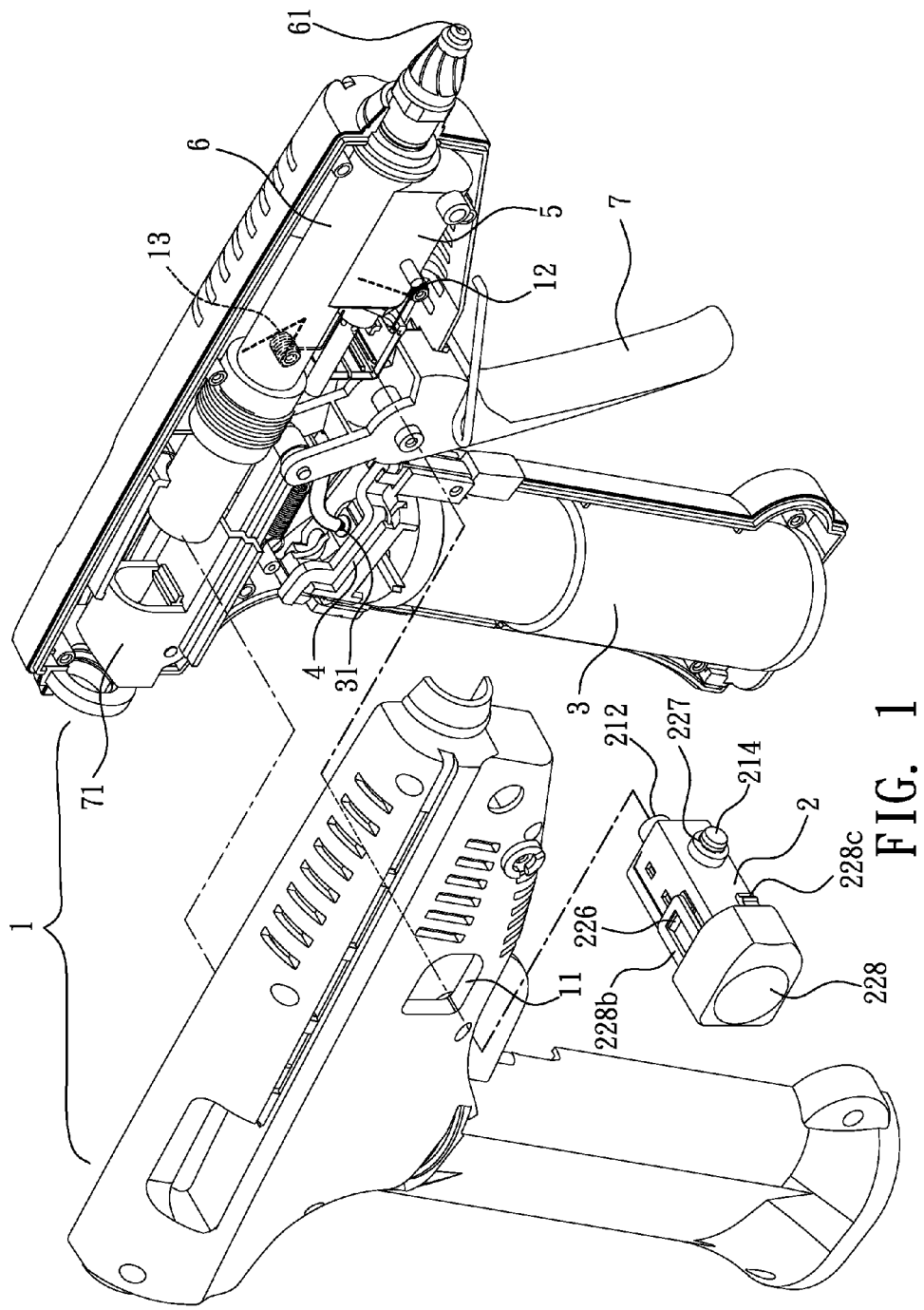
FIG. 1 is a perspective exploded view illustrating the gas combustor and the detachable ignition module according to the present invention.
Figure 2:
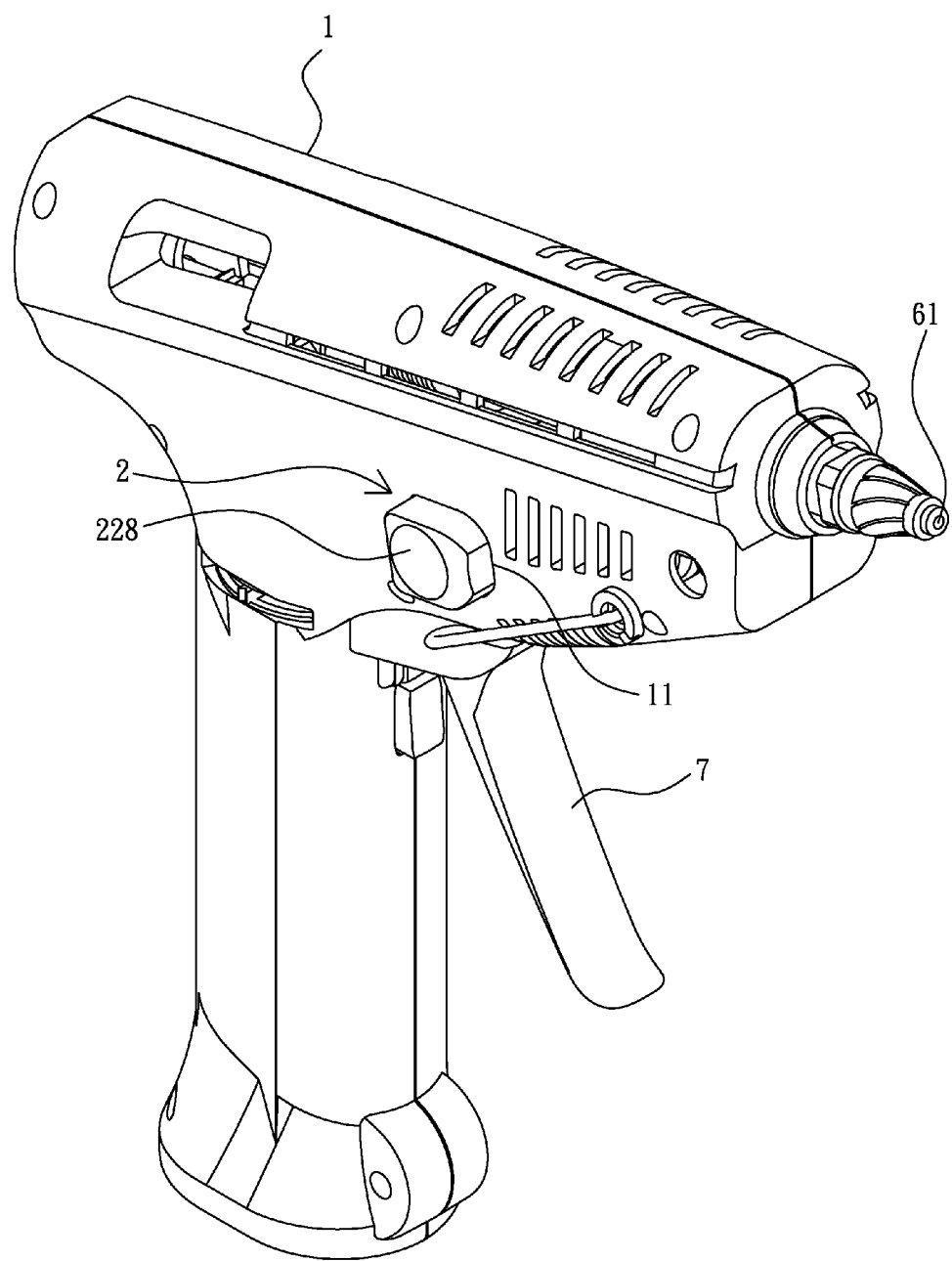
FIG. 2 is a perspective view illustrating the gas combustor being inserted with the detachable ignition module according to the present invention.
Figure 3:
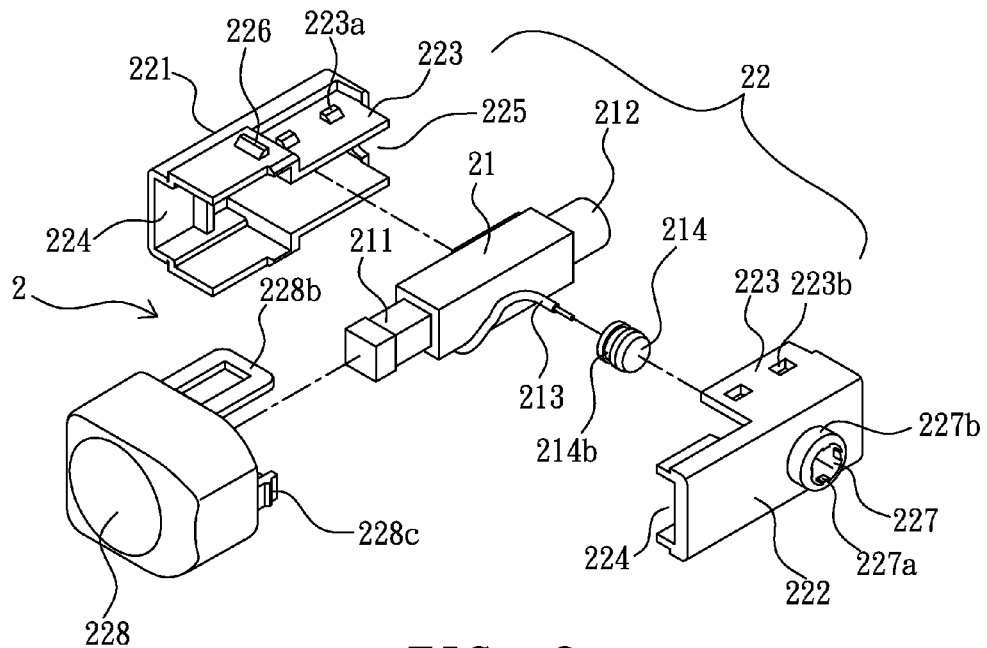
FIG. 3 is a perspective exploded view illustrating the detachable ignition module according to the present invention.
Figure 4:
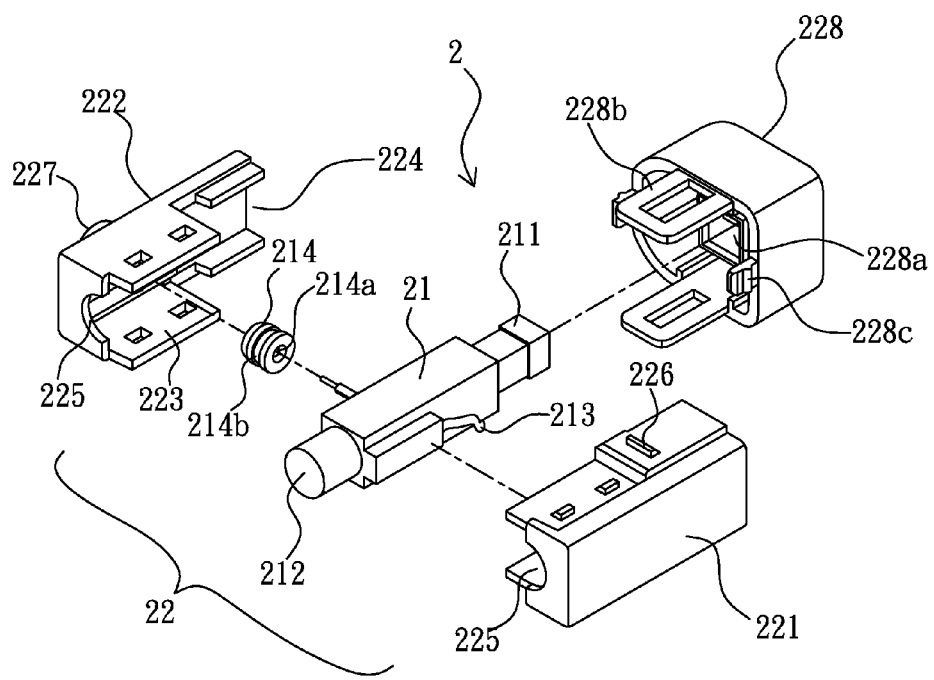
FIG. 4 is another perspective exploded view illustrating the detachable ignition module being viewed from another angle according to the present invention.
Figure 5:
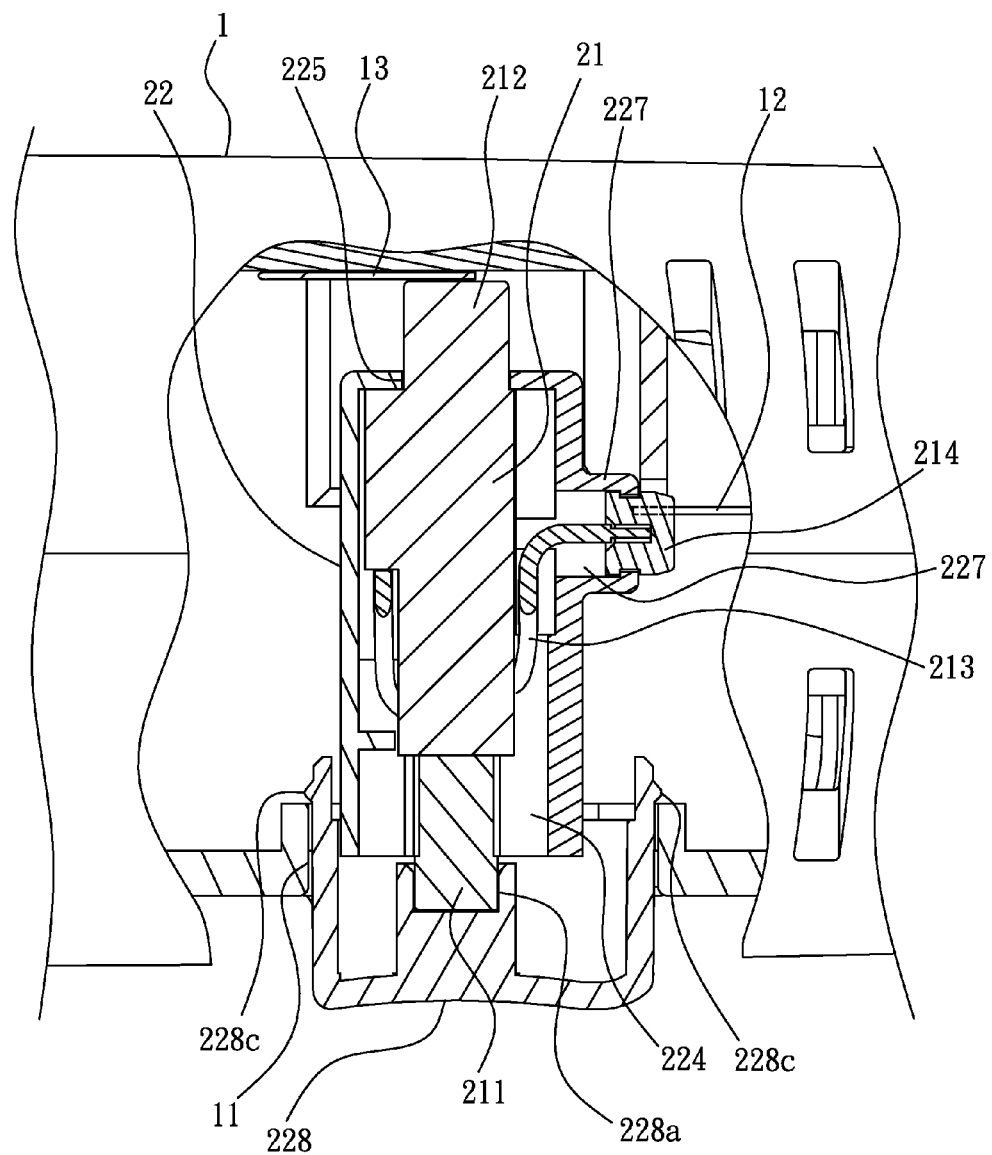
FIG. 5 is a cross sectional view illustrating the gas combustor being inserted with the detachable ignition module according to the present invention.

Referring from FIG. 1 to FIG. 5, wherein FIG. 1 is a perspective exploded view illustrating the gas combustor and the detachable ignition module according to the present invention; FIG. 2 is a perspective view illustrating the gas combustor being inserted with the detachable ignition module according to the present invention; FIG. 3 is a perspective exploded view illustrating the detachable ignition module according to the present invention; FIG. 4 is another perspective exploded view illustrating the detachable ignition module being viewed from another angle according to the present invention; and FIG. 5 is a cross sectional view illustrating the gas combustor being inserted with the detachable ignition module according to the present invention.

As shown from FIG. 1 to FIG. 5, the gas combustor provided by the present invention substantially includes a detachable ignition module capable of being inserted in or removed from the gas combustor e.g. but not limited to a gas-heated melt glue gun. Wherein, the gas combustor includes a casing unit 1 formed with an insertion slot 11 on a surface thereof, and the detachable ignition module 2 includes an igniter 21 and an enveloping member 22.

As shown in FIG. 3 and FIG. 4, the igniter 21 is a conventional component, the front and the rear thereof are respectively installed with a push rod 211 and a cathode connecting joint 212, a lateral side thereof is extended with a conductive wire 213, one free end of the conductive wire 213 is inserted in an insertion hole 214*a* formed on an anode connecting joint 214; wherein the periphery of the anode connecting joint 214 is formed with a mount slot 214*b* for being connected and buckled with the enveloping member 22.

The enveloping member 22 consists of a left shell 221 and a right shell 222 engaging with each other so as to envelop the igniter 21. The top and the bottom at the rear side of the left and the right shell 221, 222 are oppositely formed with an engaging piece 223 which is provided with at least a buckle tenon 223*a*, at least a buckle hole 223*b* capable of being mutually buckled, so after the left and the right shell 221, 222 are engaged, the front and the rear of the enveloping member 22 are respectively formed with a tubular front and a tubular rear opening 224, 225 respectively allowing the push rod 211 and the cathode connecting joint 212 to protrude. In addition, the top and the bottom surface at the front of the enveloping member 22 are oppositely and protrudingly formed with a pair of positioning tenons 226 for being buckled with a push button 228, thereby preventing the push button 228 from being released from the front of the enveloping member 22. Moreover, one lateral surface of the enveloping member 22 is formed with an accommodating hole 227 allowing the anode connecting joint 214 to be positioned and protruded, an inner wall of the accommodating hole 227 is annularly formed with at least a mount tenon 227*a* capable of being mutually mounted with the mount slot 214*b* of the anode connecting joint 214. The accommodating hole 227 is formed in a sleeve cylinder 227*b* protruding from one lateral surface of the enveloping member 22, thereby allowing the anode connecting joint 214 to be protruded out of the sleeve cylinder 227*b*.

The push button 228 is a cap member having a non-symmetrical shape, thereby a situation of wrongly inserted in the insertion slot 11 of the casing unit 1 being avoided. An inner wall at the front of the push button 28 is formed with a connection hole 228*a* allowing the push rod 211 to be received, the top and the bottom surface at the rear are horizontally and oppositely formed with a pair of elongated buckle racks 228*b*, the pair of buckle racks 228*b* are connected and abutted against the positioning tenons 226 oppositely formed at the top and the bottom surface of the enveloping member 22, thereby preventing the push button 228 from being released from the front of the enveloping member 22. Furthermore, two sides at the rear of the push button 228 are oppositely formed with a pair of buckle hooks 228*c* so as to be buckled at inner edges of two lateral walls of the insertion slot 11 preformed on the casing unit 1 of the gas combustor, thereby preventing the enveloping member 22 from being released from the insertion slot 11.

As such, when the push button 228 is pushed, the pair of elongated buckle racks 228*b* are backwardly moved along the top and the bottom surface of the enveloping member 22, and the push rod 211 of the igniter 21 is squeezed, so the igniter 21 is enabled to elastically store energy, and high voltage electrostatic is generated and transferred to the anode connecting joint 214; when the push button 228 is released, the igniter 21 is enabled to elastically release energy for driving the push rod 211 and the push button 228 to be recovered to the original positions, and the pair of elongated buckle racks 228*b* are forwardly moved along the top and the bottom surface of the enveloping member 22, and abutted against the rear ends of the pair of positioning tenons 226.

Referring to FIG. 1, the igniter 21 and the enveloping member 22 are assembled to form the detachable ignition module 2, and the detachable ignition module 2 is ready to be inserted in the insertion slot 11 of the casing unit 1 of the gas combustor e.g. the gas-heated melt glue gun.

As shown in FIG. 1, FIG. 2 and FIG. 5, the shape and the dimension of the insertion slot 11 is corresponding to the push button 228, e.g. being formed in a rectangular shape with the top right and the bottom right end being chamfered as a non-symmetrical cap member. The interior of the insertion slot 11 is respectively formed with an electric conductive wire, e.g. a first and a second electric conductive spring 12, 13, corresponding to the inserting location of the anode and the cathode connection joint 214, 212 of the detachable ignition module 2 and being in contact with a combustion device 5.

When a combustion operation is desired to be processed, the user only has to insert the detachable ignition module 2 into the insertion slot 11, the anode and the cathode connecting joint 214, 212 is respectively in contact with the first and the second electric conductive spring 12, 13, thereby forming an electric connection. The buckle hooks 228*c* at two sides of the push button 228 are buckled at the inner edges at two lateral walls of the insertion slot 11, thereby preventing the enveloping member 22 from being released from the insertion slot 11.

As shown in FIG. 1, the position where a handle being installed on the casing unit 1 of the gas-heated melt blue gun is provided with a gas storing tank 3, a gas discharge nozzle 31 formed on the top surface of the gas storing tank 3 is controlled by a control device 4 for controlling the fuel supply. When the gas discharge nozzle 31 is stretched by the control device 4, the fuel gas is enabled to pass a soft gas pipe provided between the gas discharge nozzle 31 and the combustion device 5 so as to enter the combustion device 5. Then, the push button 228 is pushed, the push rod 211 of the igniter 21 in the enveloping member 22 is squeezed, the generated high voltage electrostatic passes the conductive wire 213, the anode connecting joint 214 and the first electric conductive spring 12, thereby generating high voltage electrostatic arc between a combustion chamber and a flame nozzle inside the combustion device 5, and a mixed fuel gas contained the fuel gas and air ejected from the flame nozzle is synchronously ignited so as to heat a heating tube 6 allowing a glue bar to be inserted from the top.

At this moment, the high voltage electrostatic passes the heating tube 6 and the second electric conductive spring 13, and returns to the igniter 21 through the cathode connecting joint 212, thereby forming an electric conducting loop. The glue bar inside the heating tube 6 can be heated for being melted to a gel state, and the glue bar inserted in the heating tube 6 from the rear of the casing unit 1 can be conveyed through a convey ring 71 of an elastic pushing type convey mechanism 7, so the melted glue gel can be squeezed out from a discharge port 61 formed at the front of the heating tube 6. The operation of gas-heated melt glue gun heating, feeding and squeezing the glue bar is a conventional art, therefore no further illustration is provided.

If the detachable ignition module 2 is damaged after being repeatedly pushed, the user only has to hold the push button 228 of the damaged detachable ignition module 2 and pull it out from the insertion slot 11 of the casing unit 1, the elastic buckle hooks 228c at two sides of the push button 228 are released from the inner walls at two sides of the insertion slot 11; at this moment, the anode and the cathode connecting joint 214, 212 of the detachable ignition module 2 is immediately separated from the electric conductive wire, e.g. the first and the second electric conductive spring 12, 13. Then, a new detachable ignition module 2 is inserted in the insertion slot 11 for enabling the anode and the cathode connecting joint 214, 212 of the detachable ignition module 2 to be in contact with the electric conductive wire, e.g. the first and the second electric conductive spring 12, 13, the replacement for a new module is finished.

In addition, for preventing children from playing the gas combustor, after the combustion operation is finished, the user can pull out the detachable ignition module 2 from the insertion slot 11 of the casing unit 1 and store by himself, such that the flame nozzle in the combustion device 5 of the gas combustor is unable to be ignited without the detachable ignition module 2, thereby ensuring the gas combustor to be properly and safely operated.

As what has been disclosed above, in actual practice, the advantages achieved by the present invention include the following: the detachable ignition module is to modularize the igniter as a single unit, so as to be inserted in the insertion slot of the casing unit of the gas combustor, and to be electrically connected to the electric conductive wire preformed in the insertion slot; when the detachable ignition module is damaged, the damaged detachable ignition module can be easily replaced without disassembling the gas combustor, thereby prolonging the service life of the gas combustor; moreover, when the gas combustor is not desired to be used, the detachable ignition module can be removed thereby preventing children from playing the gas combustor or even accidentally igniting the gas combustor, so the detachable ignition module can also be served as a safety device for the gas combustor. Accordingly, the gas combustor and the detachable ignition module thereof provided by the present invention is novel and practical in use comparing to prior art.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A gas combustor, including:
    a casing unit, a surface thereof being formed with an insertion slot, the interior of said insertion slot being installed with an electric conductive wire being in contact with a combustion device; and
    a detachable ignition module, having an enveloping member installed with an igniter therein, a push rod, a cathode connecting joint and an anode connecting joint of said igniter being respectively protruded from a front, a rear and aside opening formed on said enveloping member, and a push button being connected to said push rod, thereby allowing said push button to push said push rod; through said detachable ignition module being inserted in or removed from said insertion slot, said cathode connecting joint and said anode connecting joint of said detachable ignition module being respectively in contact with or separated from said electric conductive wire installed in said insertion slot, thereby establishing or terminating an electric connection;
    wherein the top and the bottom surface at the front of said enveloping member are oppositely and protrudingly formed with a pair of positioning tenons protruding from the top surface and the bottom surface, one lateral surface thereof is formed with an accommodating hole allowing said anode connecting joint to be positioned and protruded, the top and the bottom surface at the rear of said push button are horizontally and oppositely formed with a pair of elongated buckle racks connected to said pair of positioning tenons, said positioning tenons are inserted into said pair of elongated buckle racks.

2. The gas combustor as claimed in claim 1, wherein said electric conductive wire includes a first and a second electric conductive spring.

3. The gas combustor as claimed in claim 1, wherein said push button is a cap member having a non-symmetrical shape, an inner wall at the front of said push button is formed with a connection hole allowing said push rod to be received, two sides at the rear of said push button are oppositely formed with a pair of elastic buckle hooks so as to be buckled at inner edges of two lateral walls of said insertion slot.

4. A detachable ignition module used in a gas combustor, including:
    an igniter, the front and the rear thereof being respectively installed with a push rod and a cathode connecting joint, a lateral side thereof being extended with an conductive wire, one free end of said conductive wire being connected to an anode connecting joint; and
    an enveloping member, used for enveloping said igniter, and said push rod, said cathode connecting joint and said anode connecting joint being respectively protruded from a front, a rear and a side opening formed on said enveloping member, and a push button being connected to said push rod, thereby allowing said push button to push said push rod;
    wherein the top and the bottom surface at the front of said enveloping member are oppositely and protrudingly formed with a pair of positioning tenons protruding from the top surface and the bottom surface, one lateral surface thereof is formed with an accommodating hole allowing said anode connecting joint to be positioned and protruded, the top and the bottom surface at the rear of said push button are horizontally and oppositely formed with a pair of elongated buckle racks connected to said pair of positioning tenons, said positioning tenons are inserted into said pair of elongated buckle racks.

5. The detachable ignition module used in a gas combustor as claimed in claim 4, wherein said push button is a cap member having a non-symmetrical shape, an inner wall at the front of said push button is formed with a connection hole allowing said push rod to be received, two sides at the rear of said push button are oppositely formed with a pair of elastic buckle hooks.

6. The detachable ignition module used in a gas combustor as claimed in claim 4, wherein said anode connecting joint is formed with an insertion hole allowing one free end of said conductive wire to be inserted, the periphery of said anode connecting joint is formed with a mount slot, an inner wall of said accommodating hole is annularly formed with at least a mount tenon capable of being mutually mounted with said mount slot of said anode connecting joint.

7. The detachable ignition module used in a gas combustor as claimed in claim 4, wherein said accommodating hole is formed in a sleeve cylinder protruding from one lateral surface of said enveloping member, thereby allowing said anode connecting joint to be protruded out of said sleeve cylinder.

8. The detachable ignition module used in a gas combustor as claimed in claim 4, wherein said enveloping member consists of a left shell and a right shell engaging with each other, the top and the bottom at the rear side of said left and said right shell are oppositely formed with an engaging piece which is provided with at least a buckle tenon and a buckle hole capable of being mutually buckled, so after said buckle tenon and said buckle hole of said left and said right shell are buckled, said enveloping member having a tubular front and a tubular rear opening is formed.

* * * * *